US012298697B2

(12) United States Patent
Fukai

(10) Patent No.: US 12,298,697 B2
(45) **Date of Patent: *May 13, 2025**

(54) IMAGE FORMING APPARATUS

(71) Applicant: Konica Minolta, Inc., Tokyo (JP)

(72) Inventor: Shougo Fukai, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/385,858

(22) Filed: Oct. 31, 2023

(65) Prior Publication Data

US 2024/0061366 A1 Feb. 22, 2024

Related U.S. Application Data

(63) Continuation of application No. 16/597,506, filed on Oct. 9, 2019, now Pat. No. 11,841,664, which is a
(Continued)

(30) Foreign Application Priority Data

Dec. 15, 2015 (JP) ................................ 2015-244106

(51) Int. Cl.
*G03G 15/00* (2006.01)
*G03G 15/01* (2006.01)

(52) U.S. Cl.
CPC ......... *G03G 15/6529* (2013.01); *G03G 15/01* (2013.01); *G03G 15/0189* (2013.01);
(Continued)

(58) Field of Classification Search
CPC ............ G03G 15/657; G03G 15/5062; G03G 15/652; G03G 2215/00569;
(Continued)

(56) References Cited

U.S. PATENT DOCUMENTS 5,791,541 A 8/1998 Jitsuishi et al.
8,922,854 B2 12/2014 Hyoki
(Continued)

FOREIGN PATENT DOCUMENTS

JP H04-334163 A 11/1992
JP H11-127350 A 5/1999
(Continued)

OTHER PUBLICATIONS

Notification of Reasons for Refusal issued Feb. 27, 2018, in Japanese Patent Application No. 2015-244106, with English translation, 11 pages.
(Continued)

*Primary Examiner* — Jennifer Bahls
*Assistant Examiner* — Quang X Nguyen
(74) *Attorney, Agent, or Firm* — Squire Patton Boggs (US) LLP

(57) ABSTRACT

An image forming apparatus is provided, including a conveying member configured to convey a long paper along a paper path; an image forming unit which forms an image on the long paper being conveyed by the conveying member along the paper path; an image reading unit which reads a surface of the long paper, the surface having the image formed by the image forming unit; and a color sample member which is arrangeable at a position facing the image reading unit, such that the long paper is conveyed by the conveying member to avoid passing through between the image reading unit and the color sample member. Also included is a switch between a first arrangement in which the image reading unit reads the long paper and a second arrangement in which the image reading unit faces the long paper via the color sample member and reads the color sample member, the switch being made by moving the
(Continued)

image reading unit or by moving the color sample member and the conveying member.

22 Claims, 10 Drawing Sheets

Related U.S. Application Data continuation of application No. 16/242,910, filed on Jan. 8, 2019, now Pat. No. 10,712,702, which is a continuation of application No. 15/366,929, filed on Dec. 1, 2016, now Pat. No. 10,209,661.

(52) U.S. Cl.
CPC ....... *G03G 15/5062* (2013.01); *G03G 15/652* (2013.01); *G03G 2215/00569* (2013.01)

(58) Field of Classification Search
CPC ............. G03G 15/6529; G03G 15/553; G03G 15/5041; G03G 15/6573; H04N 1/60; H04N 1/6036; H04N 1/6038; H04N 1/6041; H04N 1/00063; H04N 1/00084; H04N 1/00087; G06K 15/027
See application file for complete search history.

(56) References Cited

U.S. PATENT DOCUMENTS

| | | | | |
|---|---|---|---|---|
| 10,209,661 | B2 | 2/2019 | Fukai | |
| 11,841,664 | B2 * | 12/2023 | Fukai | G03G 15/5062 |
| 2002/0100863 | A1 | 8/2002 | Spears | |
| 2012/0020713 | A1 * | 1/2012 | Ishii | G03G 15/5062 399/388 |
| 2012/0106987 | A1 * | 5/2012 | Furusawa | G03G 15/5062 399/15 |
| 2013/0135636 | A1 | 5/2013 | Kosuge et al. | |
| 2013/0330092 | A1 * | 12/2013 | Amit | G03G 15/01 399/15 |
| 2016/0167398 | A1 | 6/2016 | Motosugi et al. | |
| 2016/0286093 | A1 * | 9/2016 | Negishi | G03G 15/5058 |
| 2019/0146399 | A1 | 5/2019 | Fukai | |

FOREIGN PATENT DOCUMENTS

| | | | |
|---|---|---|---|
| JP | 2003-211770 | A | 7/2003 |
| JP | 2008-011450 | A | 1/2008 |
| JP | 2008-281549 | A | 11/2008 |
| JP | 2013-111758 | A | 6/2013 |
| JP | 2017-112451 | A | 6/2017 |

OTHER PUBLICATIONS

Decision of Refusal issued Sep. 25, 2018, in Japanese Patent Application No. 2015-244106, with English translation, 18 pages.
First Chinese Office Action issued Sep. 27, 2018, in Chinese Patent Application No. 2016111520333, with English translation, 12 pages.
Notice of Reasons for Refusal issued Feb. 5, 2020, in Japanese Patent Application No. 2018-240522, with English translation, 12 pages.

* cited by examiner

IMAGE FORMING APPARATUS

CROSS-REFERENCE TO RELATED APPLICATIONS

This application is a continuation of U.S. patent application Ser. No. 16/597,506, filed Oct. 9, 2019, which is a continuation of U.S. patent application Ser. No. 16/242,910 (U.S. Pat. No. 10,712,702), filed on Jan. 8, 2019, which is a continuation of U.S. patent application Ser. No. 15/366,929 (U.S. Pat. No. 10,209,661), filed on Dec. 1, 2016, which claims priority under the Paris Convention to Japanese Patent Application No. 2015-244106 filed on Dec. 15, 2015, which applications are incorporated herein by reference in their entirety.

BACKGROUND OF THE INVENTION

1. Field of the Invention

The present invention relates to an image forming apparatus.

2. Description of the Related Art

Image forming apparatuses include an image forming apparatus provided with an image reading unit which reads a surface of paper (paper surface) having undergone image forming.

By using the read image obtained by the image reading unit, misregistrtaion of the formed image can be detected (refer to, for example, Japanese Patent Application Publication No. 2003-211770), and also various types of calibration, such as correction of luminance non-uniformity of the image reading unit, called shading correction, can be performed (refer to, for example, Japanese Patent Application Publication No. 11-127350).

At the time of detection of misregistration of the image, in order to read the paper surface, a background member having a white surface as a reflective plate is arranged at a position facing the image reading unit via the paper surface. On the other hand, at the time of calibration, in order to read a color sample member having a surface of a reference color (s), the color sample member needs to be arranged at the position facing the image reading unit without paper in between.

To switch the background member and the color sample member depending on the reading target, as shown in FIG. 10, a prism F having a background member F1 and a color sample member F2 on lateral surfaces can be used. For example, at the time of detection of misregistration of an image, the prism F is rotated such that the background member F1 is arranged at the position facing an image reading unit 30, and the image reading unit 30 reads the surface of (a sheet of) paper P (paper surface), whereas at the time of calibration, the prism F is rotated such that the color sample member F2 is arranged at the position facing the image reading unit 30, and the image reading unit 30 reads the color sample member F2 between sheets of paper P.

If the paper is cut paper, which has been cut to be a prescribed size of sheets, as shown in FIG. 10, there is a space between sheets of paper P. Therefore, there is a chance to read the color sample member F2 which is arranged under the paper P.

However, if the paper is long paper, such as rolled paper, the paper is continuously conveyed. Hence, unlike cut paper, there is no space between sheets of paper, and even while image forming stops, the paper is on a paper path. Therefore, there is no chance to read the color sample member F2 which is arranged under the paper.

BRIEF SUMMARY OF THE INVENTION

Briefly and in general terms, the present invention is directed to an image forming apparatus. In one embodiment, the in image forming apparatus comprises: a conveying member configured to convey a long paper along a paper path; an image forming unit which forms an image on the long paper being conveyed by the conveying member along the paper path; an image reading unit which reads a surface of the long paper, the surface having the image formed by the image forming unit; and a color sample member which is arrangeable at a position facing the image reading unit, wherein the long paper is conveyed by the conveying member to avoid passing through between the image reading unit and the color sample member, and a switch between a first arrangement in which the image reading unit reads the long paper and a second arrangement in which the image reading unit faces the long paper via the color sample member and reads the color sample member, the switch being made by moving the image reading unit or by moving the color sample member and the conveying member.

In another embodiment, the image forming apparatus comprises: a conveying member configured to convey a paper along a paper path; an image reading unit configured to read a surface of the paper conveyed by the conveying member along the paper path; and a color sample member, wherein the conveying member, the image reading unit, and the color sample member have a first arrangement in which the image reading unit reads the surface of the paper conveyed by the conveying member along the paper path, the conveying member, the image reading unit, and the color sample member have a second arrangement in which the image reading unit reads the color sample member, and the image reading unit is configured to move in a paper conveying direction for switching from the first arrangement to the second arrangement.

The features and advantages of the invention will be more readily understood from the following detailed description which should be read in conjunction with the accompanying drawings.

BRIEF DESCRIPTION OF THE SEVERAL VIEWS OF THE DRAWING

The present invention is fully understood from the detailed description given hereinafter and the accompanying drawings, which are given byway of illustration only and thus are not intended to limit the present invention, wherein.

DETAILED DESCRIPTION OF THE INVENTION

Hereinafter, an image forming apparatus according to an embodiment of the present invention is described with reference to the drawings.

Figure 1:
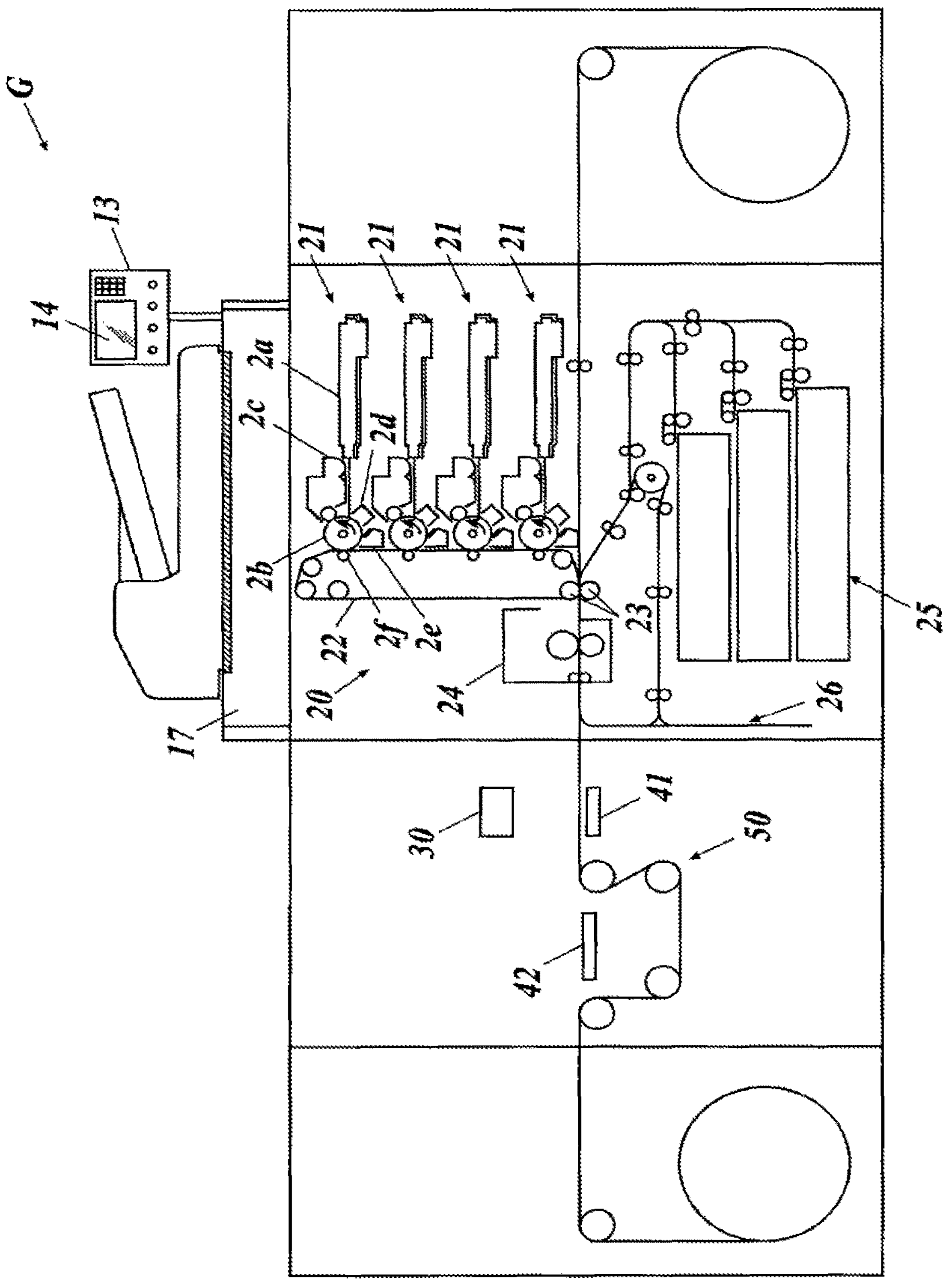
FIG. 1 is a front view schematically showing the configuration of an image forming apparatus according to an embodiment of the present invention.

FIG. 1 schematically shows the configuration of an image forming apparatus G according to an embodiment of the present invention.

As shown in FIG. 1, the image forming apparatus G includes: a conveying member 50 including rollers and a belt; and an image forming unit 20 which forms image (s) on (a surface of) long paper being conveyed by the conveying member 50. The "long paper" is paper, such as rolled paper, having a length in a paper conveying direction longer than the length of a paper path from a paper feeding position to a paper ejecting position of the image forming apparatus G.

As shown in FIG. 1, the image forming apparatus G also includes an image reading unit 30, and can perform examinations of images to detect misregistration, defects and so forth and various types of calibration, for example, by reading the surface of long paper (hereinafter "long-paper surface") with the image reading unit 30.

The image forming apparatus G also includes a background member 41 and a color sample member 42 which are movable to a position facing the image reading unit 30, and can take (switch to) a first arrangement in which the image reading unit 30 faces the background member 41 via the long paper at the time of examinations of images and take (switch to) a second arrangement in which the image reading unit 30 faces the color sample member 42 at the time of calibration.

Figure 2:
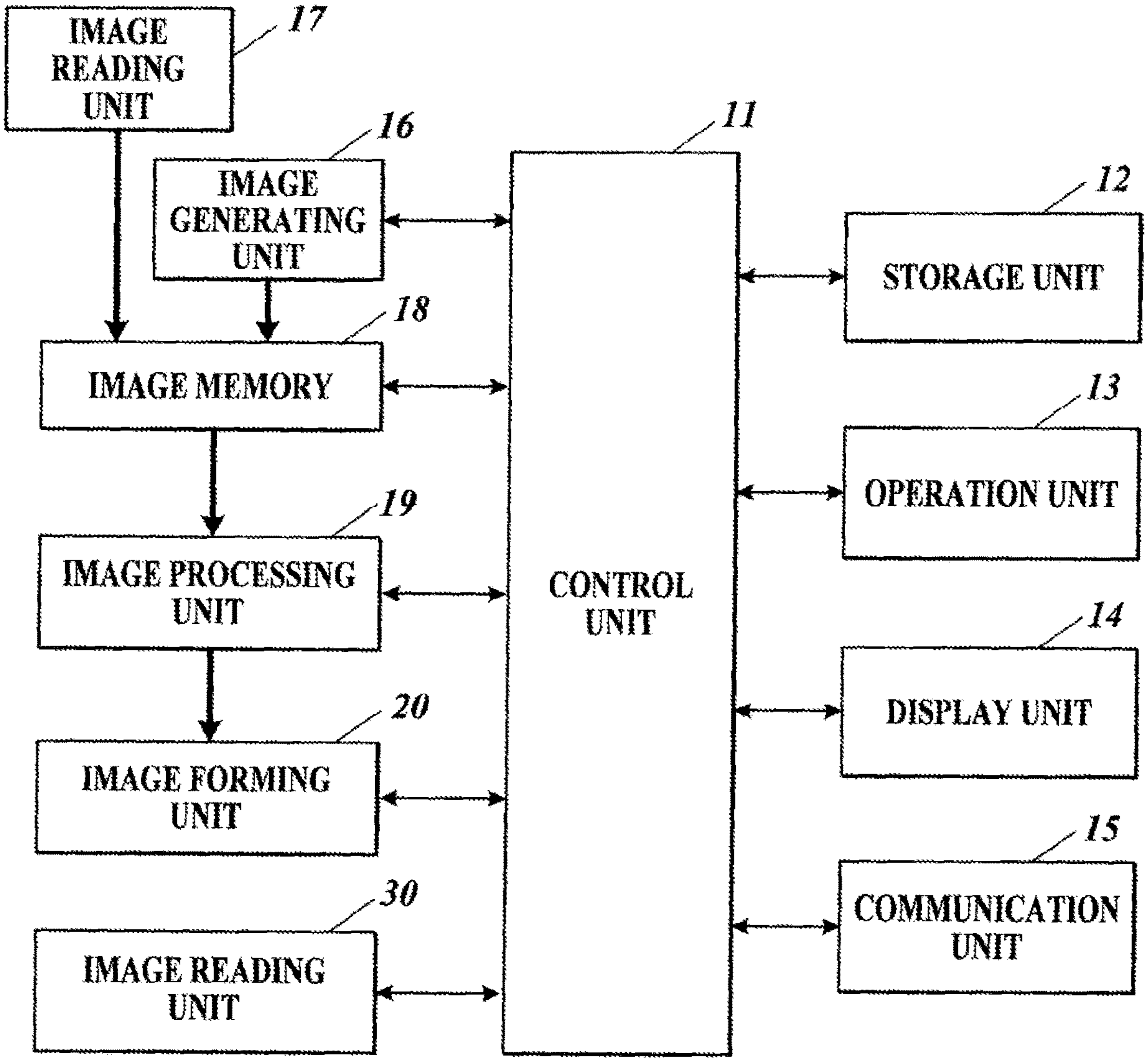
FIG. 2 is a block diagram showing components of the image forming apparatus by function.

FIG. 2 shows components of the image forming apparatus G by function.

As shown in FIG. 2, the image forming apparatus G includes a control unit 11, a storage unit 12, an operation unit 13, a display unit 14, a communication unit 15, an image generating unit 16, an image reading unit 17, an image memory 18, an image processing unit 19 and the above-described image forming unit 20 and image reading unit 30.

The control unit 11 reads programs stored in the storage unit 12 and executes the read programs, thereby controlling the units or the like of the image forming apparatus G. The control unit 11 includes a CPU (Central Processing Unit) and a RAM (Random Access Memory).

For example, the control unit 11 causes the image processing unit 19 to perform image processing on an original image generated by the image generating unit 16 or the image reading unit 17 and causes the image forming unit 20 to form an image on long paper on the basis of the image-processed original image.

At the time of examinations of images to detect misregistration, defects and so forth, the control unit 11 performs control to move the background member 41, the color sample member 42 and the conveying member 50, thereby switching to the first arrangement in which the image reading unit 30 faces the background member 41 via the long paper, and causes the image reading unit 30 to read the long-paper surface with the background member 41 as the background.

After performing shading correction on the read image of the long-paper surface, the control unit 11 compares the read image with an inspected normal image, and if the difference therebetween is equal to or more than a threshold value, detects it as abnormality of misregistration, defects or the like.

At the time of calibration, such as adjustment of shading correction values and adjustment of densities of images to be formed, the control unit 11 performs control to move the background member 41, the color sample member 42 and the conveying member 50, thereby switching to the second arrangement in which the image reading unit 30 faces the color sample member 42, and causes the image reading unit 30 to read the color sample member 42.

After performing shading correction on the read image of the color sample member 42, the control unit 11 compares the read image with an image of reference colors, and depending on the difference therebetween, calculates shading correction values or updates a lookup table which the image processing unit 19 uses for color conversion.

The storage unit 12 stores, for example, programs readable by the control unit 11 and data necessary for execution of the programs. As the storage unit 12, a mass memory, such as a hard disk, can be used.

The operation unit 13 and the display unit 14 are, as shown in FIG. 1, disposed at the upper part of the image forming apparatus G as a user interface.

The operation unit 13 generates operation signals corresponding to user operations and outputs the operation signals to the control unit 11. Examples of the operation unit 13 include keys and a touch panel integrated with the display unit 14.

The display unit 14 displays an operation screen and so forth in response to commands of the control unit 11. Examples of the display unit 14 include an LCD (Liquid Crystal Display) and an OELD (Organic Electro Luminescence Display).

The communication unit 15 communicates with external apparatuses on a network. Examples of the external apparatuses include a user terminal, a server and another image forming apparatus.

For example, the communication unit 15 receives data (hereinafter "PDL data") described in PDL (Page Description Language) from a user terminal via a network.

The image generating unit 16 rasterizes the PDL data received by the communication unit 15, thereby generating an original image in bitmap (hereinafter "bitmap original image"). Each pixel of the original image has pixel values of four colors, C (cyan), M (magenta), Y (yellow) and K (black). The pixel values are data values representing tone (shade) of the image. For example, 8-bit data values represent the tone in 0 to 255 gradations, respectively.

The image reading unit 17 includes an automatic document (i.e., original) sending device and a scanner as shown in FIG. 1, and reads a surface of a document set on a document table, thereby generating a bitmap original image. Each pixel of the original image generated by the image reading unit 17 has pixel values of three colors, R (red), G (green) and B (blue). This original image is color-converted to an original image each pixel of which has pixel values of four colors, C, M, Y and K, by a not-shown color conversion unit.

The image memory 18 is a buffer memory which temporarily keeps the original image generated by the image generating unit 16 or the image reading unit 17. As the image memory 18, a DRAM (Dynamic RAM) or the like can be used.

The image processing unit 19 reads the original image from the image memory 18 and performs image processing, which is exemplified by density correction and halftoning, on the original image.

The density correction is processing to convert (correct) the pixel values of the pixels of the original image into pixel values with which density of an image to be formed on the long paper match target density.

The halftoning is processing to reproduce halftone in a pseudo manner and exemplified by error diffusion and screening employing ordered dithering.

The image forming unit 20 forms an image composed of four colors of C, M, Y and K on the long paper according to the pixel values of the pixels of the original image image-processed by the image processing unit 19.

As shown in FIG. 1, the image forming unit 20 includes four writing units 21, an intermediate transfer belt 22, a pair of secondary transfer rollers 23, a fixing device 24 and paper feed trays 25.

The four writing units 21 are disposed in series (tandem) along the belt surface of the intermediate transfer belt 22 and form C, M, Y and K images, respectively. The writing units 21 are the same in configuration. The difference therebetween is only the color of images to form. Each writing unit 21 includes, as shown in FIG. 1, an optical scanner 2*a*, a photoreceptor 2*b*, a developing unit 2*c*, a charging unit 2*d*, a cleaning unit 2*e* and a primary transfer roller 2*f*.

At the time of image forming, in each writing unit 21, after the charging unit 2*d* charges the photoreceptor 2*b*, the optical scanner 2*a* emits a beam on the basis of the original image to scan the photoreceptor 2*b*, thereby forming an electrostatic latent image, and the developing unit 2*c* supplies a color material, such as a toner, to develop the electrostatic latent image, thereby forming a toner image on the photoreceptor 2*b*.

The images formed on the photoreceptors 2*b* of the four writing units 21 are successively transferred (primary transfer) onto the intermediate transfer belt 22 by their respective primary transfer rollers 2*f* so as to be laid on top of one another, so that an image composed of the multiple colors is formed on the intermediate transfer belt 22. After the primary transfer, the cleaning units 2*e* remove the color materials remaining on the respective photoreceptors 2*b*.

The image forming unit 20 transfers (secondary transfer), with the pair of secondary rollers 23, the image on the intermediate transfer belt 22 onto the long paper (rolled paper), which is wound off and conveyed by the conveying member 50. The image forming unit 20 applies, with the fixing device 24, heat and pressure to the long paper having the image, thereby performing fixing. After the fixing, the conveying member 50 winds the long paper up.

As shown in FIG. 1, the image forming unit 20 may include: the paper feed trays 25 in each of which cut paper is housed; and a paper path 26 which can reverse the cut paper, so as to form images on one or both sides (surfaces) thereof. The "cut paper" is paper cut to be a prescribed size of sheets. Examples of the prescribed size include A4 size.

The image reading unit 30 is, as shown in FIG. 1, disposed over the paper path of the long paper having undergone image forming, and reads the long-paper surface, thereby generating the read image in bitmap.

As the image reading unit 30, a line sensor, an area sensor or the like which uses imaging elements, such as CCDs (Charge Coupled Devices), can be used.

The background member 41 and the color sample member 42 are disposed respectively under and over the paper path of the long paper to be side by side, and movable to the position facing the image reading unit 30.

The background member 41 has a surface of background colors, such as white and black, and functions as a reflective plate when the image reading unit 30 reads the long-paper surface. The color sample member 42 has a surface of reference colors.

At the time of examinations of images, because the reading target is the long paper, the first arrangement is taken, so that the image reading unit 30 faces the long paper with the background member 41 positioned on the back surface of the long paper. On the other hand, at the time of calibration, because the reading target is the color sample member 42, the second arrangement is taken, so that the image reading unit 30 faces the color sample member 42 instead of the long paper.

Figure 3A:
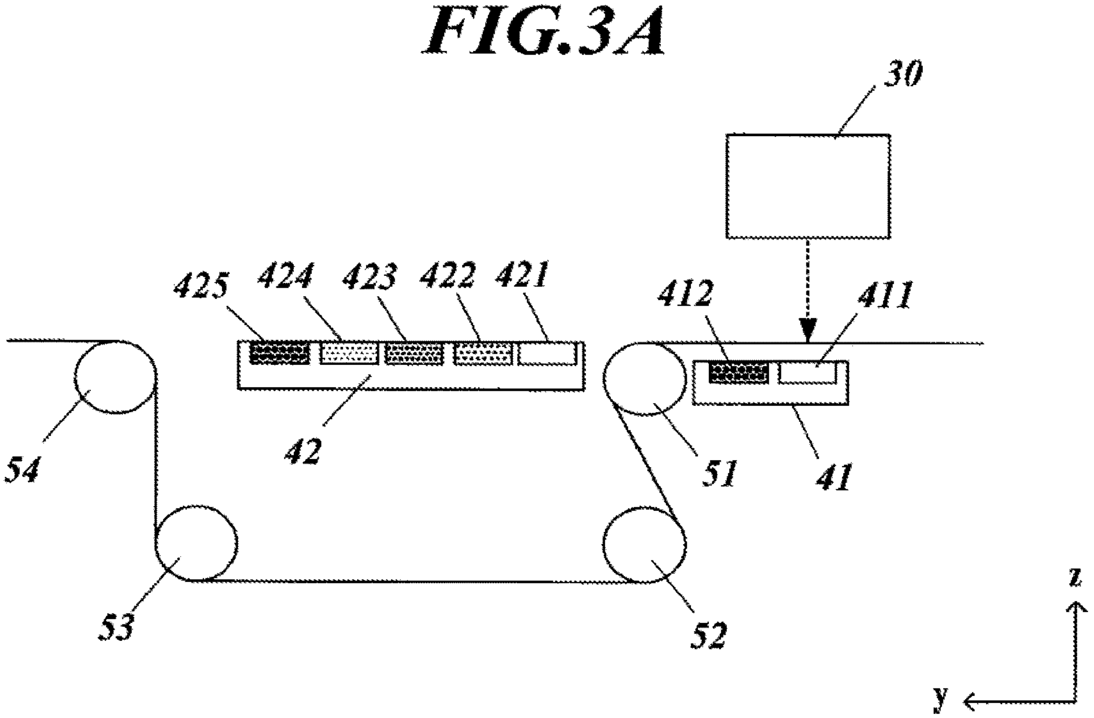
FIG. 3A is a front view showing a first arrangement in which an image reading unit faces a background member via long paper.
Figure 3B:
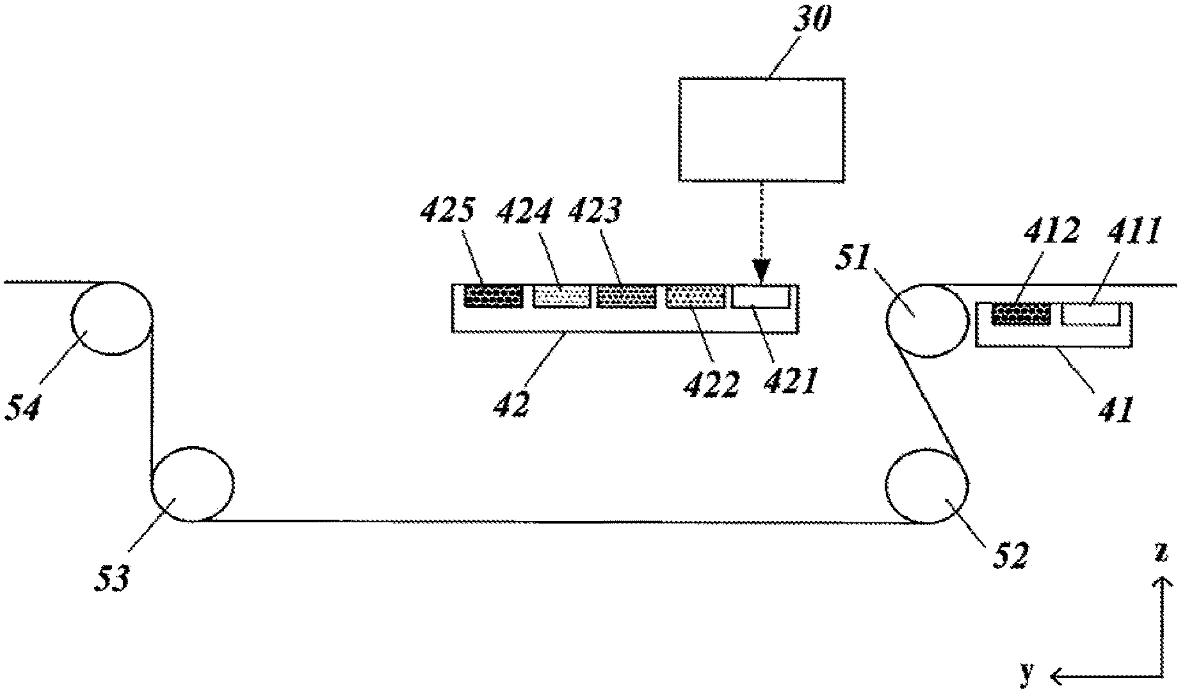
FIG. 3B is a front view showing a second arrangement in which the image reading unit faces a color sample member.

FIG. 3A shows the first arrangement in which the image reading unit 30 faces the background member 41 via the long paper. FIG. 3B shows the second arrangement in which the image reading unit 30 faces the color sample member 42.

As shown in FIG. 3A and FIG. 3B, the background member 41 and the color sample member 42 are lined up in a paper conveying direction y of the long paper and are approximately the same in position in a height direction z. The background member 41 has a white region 411 for normal reading and a black region 412 for show-through prevention on the surface which faces the image reading unit 30. The color sample member 42 has a white region 421 for shading correction and C, M, Y and K regions 422 to 425 on the surface which faces the image reading unit 30.

In front of and behind the color sample member 42, four rollers 51 to 54 as the conveying member 50 are disposed.

The paper path is configured by the rollers 51 to 54 to change the position of the long paper, which is being conveyed, in the height direction z such that the long paper passes through under the color sample member 42 after passing through between the image reading unit 30 and the background member 41. As shown in FIG. 3B, thanks to this paper path, in the second arrangement, the long paper can be conveyed to avoid passing through between the image reading unit 30 and the color sample member 42.

The background member 41, the color sample member 42 and the rollers 51 ad 52 are movable in the paper conveying direction y of the long paper.

A moving unit which moves these is not particularly limited. For example, the moving unit may be constituted of a motor, a gear connected to an output shaft of the motor, a timing belt which is wound around the gear and rotates, and so forth. Then, the background member 41, the color sample member 42 and the rollers 51 and 52 are connected to the timing belt, and the motor drives the timing belt to rotate, thereby linearly moving the background member 41, the color sample member 42 and the rollers 51 and 52 in the paper conveying direction y.

The paper path of the long paper can be changed by moving the rollers 51 and 52 in conjunction with the background member 41 and the color sample member 42 such that the long paper escapes from the position facing the image reading unit 30 at the time of switching from the first arrangement to the second arrangement as shown in FIG. 3B whereas the long paper faces the image reading unit 30 at the time of switching from the second arrangement to the first arrangement as shown in FIG. 3A.

Figure 4:
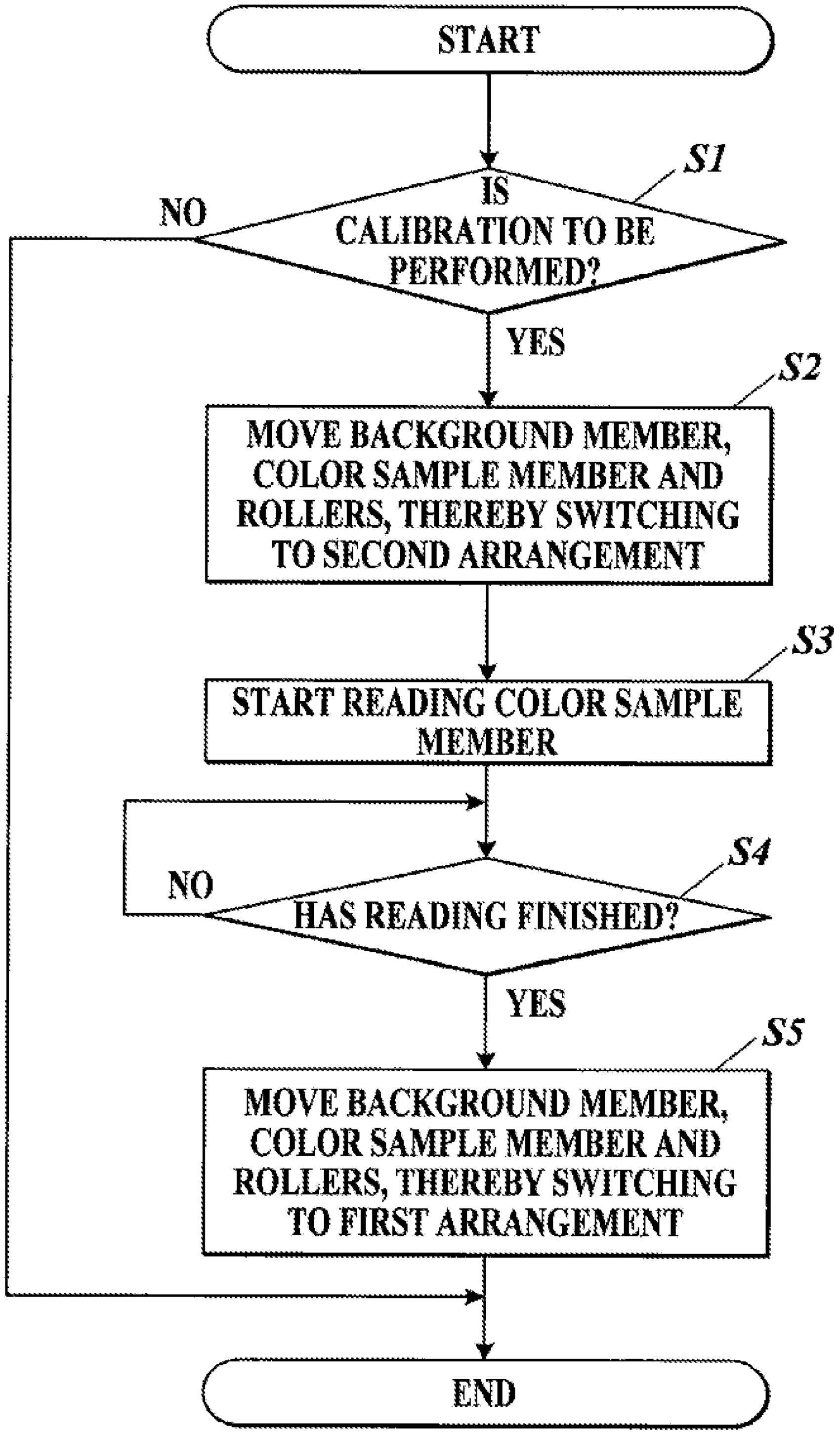
FIG. 4 is a flowchart of a procedure taken by the image forming apparatus when switching the first and second arrangements during image forming.

FIG. 4 shows a flowchart of a procedure taken by the image forming apparatus 1 when switching the first and second arrangements during image forming.

During image forming, in order to perform examinations of images by reading the long-paper surface with the image reading unit 30, the first arrangement is taken in which the image reading unit 30 faces the background member 41 via the long paper as shown in FIG. 3A. Calibration is performed when a predetermine time elapses from the last calibration.

As shown in FIG. 4, when determining that it is the timing of start of calibration (Step S1; YES), the control unit 11 performs control to move the background member 41, the color sample member 42 and the rollers 51 and 52, thereby switching to the second arrangement in which the image reading unit 30 faces the color sample member 42 (Step S2).

More specifically, as shown in FIG. 3B, the background member 41, the color sample member 42 and the rollers 51 and 52 are all moved toward the upstream side in the paper conveying direction y until the color sample member 42 faces the image reading unit 30. Moving the rollers 51 and 52, thereby changing the paper path of the long paper, can make the image reading unit 30 face the color sample member 42 without the long paper in between. Hence, the image reading unit 30 can read the reference colors of the color sample member 42.

By adjusting the moving amount(s) of the background member 41, the color sample member 42 and the rollers 51 and 52, a color region to face the image reading unit 30 can be selected from among the color regions 421 to 425 of the color sample member 42. This allows the image reading unit 30 to read a desired reference color of the plurality of reference colors of the color sample member 42. Similarly, in the first arrangement, by adjusting the moving amount(s) thereof, the color region to face the image reading unit 30 can be selected from among the color regions 411 and 412 of the background member 41.

Figure 5:
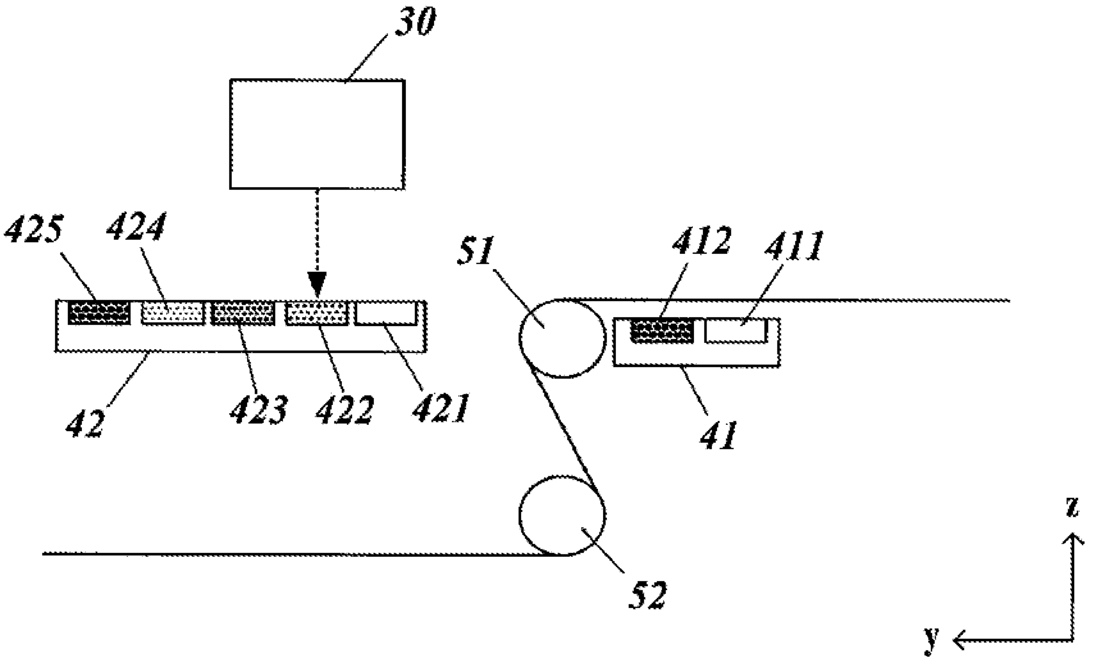
FIG. 5 shows the second arrangement in which a color region of the color sample member facing the image reading unit has been changed from one to another.

FIG. 5 shows a case where the color region of the color sample member 42 facing the image reading unit 30 has been changed from the color region 421 to the color region 422.

How to change the paper path at the time of switching the first and second arrangements is not particularly limited.

For example, FIG. 3A and FIG. 3B show an example of changing the paper path by moving both the rollers 51 and 52 without changing the length of the paper path. However, the paper path may be changed by moving one of the rollers, for example, the roller 51, as shown in FIG. 6.

Figure 6:
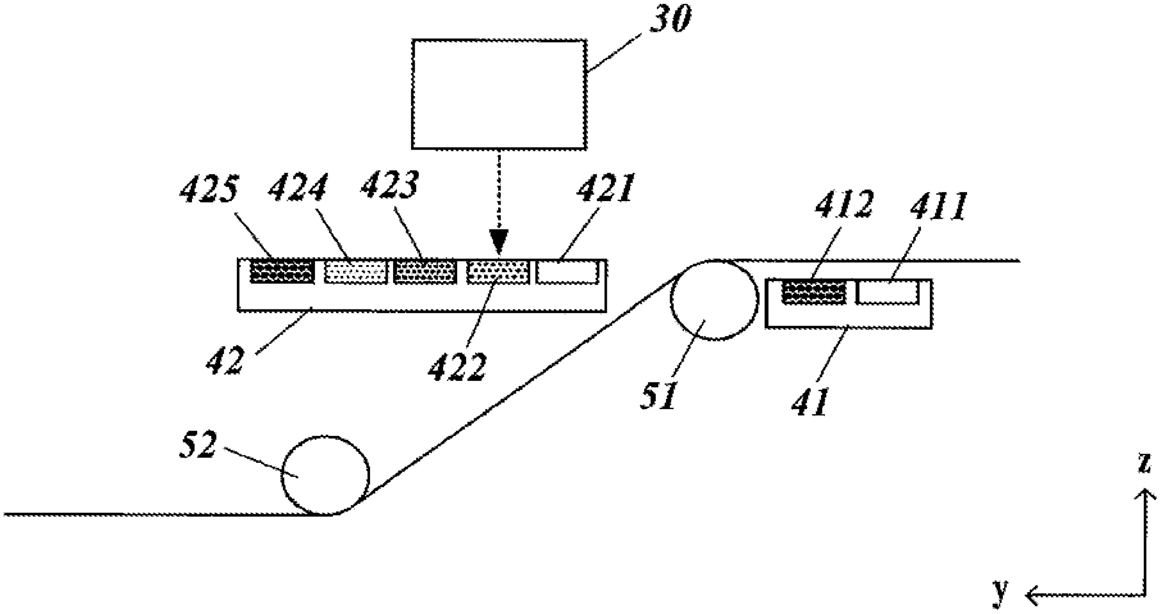
FIG. 6 is a front view showing an example of changing a paper path at the time of switching from the first arrangement to the second arrangement.

In the case where the length of the paper path changes when the paper path is changed as shown in FIG. 6, it is preferable that the conveying speed of the long paper be changed (adjusted) such that the tension of the long paper is uniform before and after the paper path is changed. This prevents poor paper conveyance which causes, for example, the long paper to be pulled too much, to slack or the like, from occurring.

For example, in the case of switching from the first arrangement shown in FIG. 3A to the second arrangement shown in FIG. 6, the conveying speed is reduced because the length of the paper path becomes long. On the other hand, in the case of switching from the second arrangement shown in FIG. 6 to the first arrangement shown in FIG. 3A, the conveying speed is increased because the length of the paper path becomes short.

The background member 41 and the color sample member 42 are not limited to the above plate-shaped members and hence may be rotating prisms.

Figure 7:
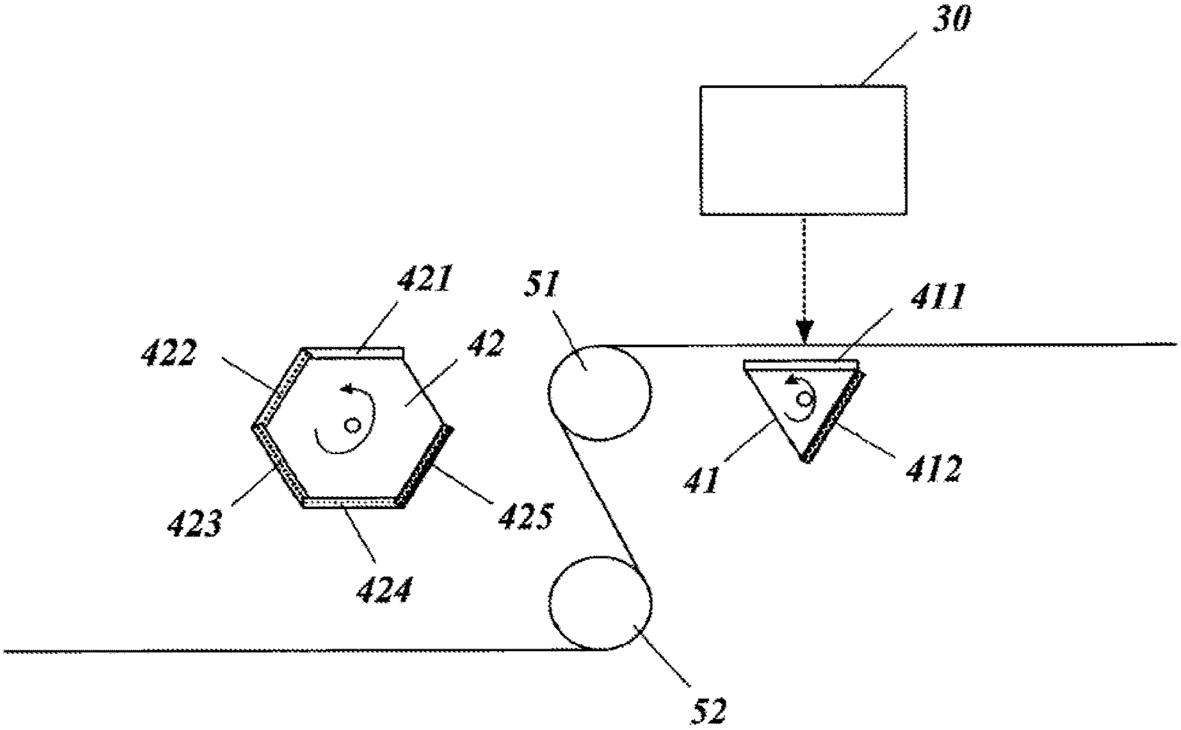
FIG. 7 is a front view showing prismatic background member and color sample member as examples of the background member and the color sample member.

FIG. 7 shows prismatic background member and color sample member as examples of the background member 41 and the color sample member 42.

As shown in FIG. 7, the background member 41, which is in the shape of a triangular prism, has the color regions 411 and 422 on lateral surfaces thereof whereas the color sample member 42, which is in the shape of a hexagonal prism, has the color regions 421 to 425 on lateral surfaces thereof. These background member 41 and color sample member 42 each can switch the color region facing the image reading unit 30 from one to another by rotating. These prismatic background member 41 and color sample member 42 are preferable because the moving amount (s) of the prismatic background member 41 and color sample member 42 can be smaller, and hence time required for switching the first and second arrangements can be shorter, as compared with the plate-shaped members 41 and 42.

The image forming apparatus G can stop conveying the long paper at the position facing the image reading unit 30.

Figure 8A:
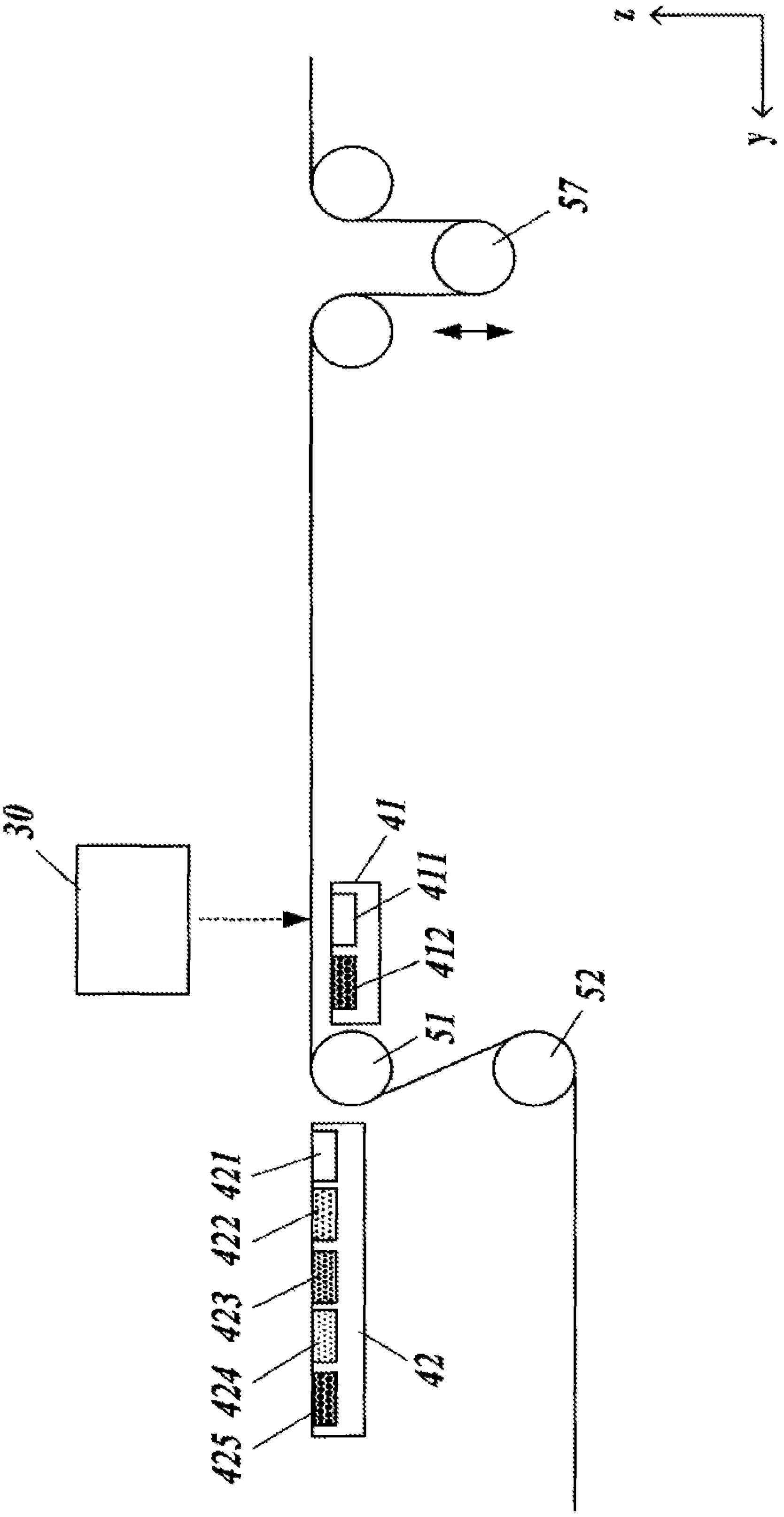
FIG. 8A is a front view showing the first arrangement in a case where a dancer roller is used.
Figure 8B:
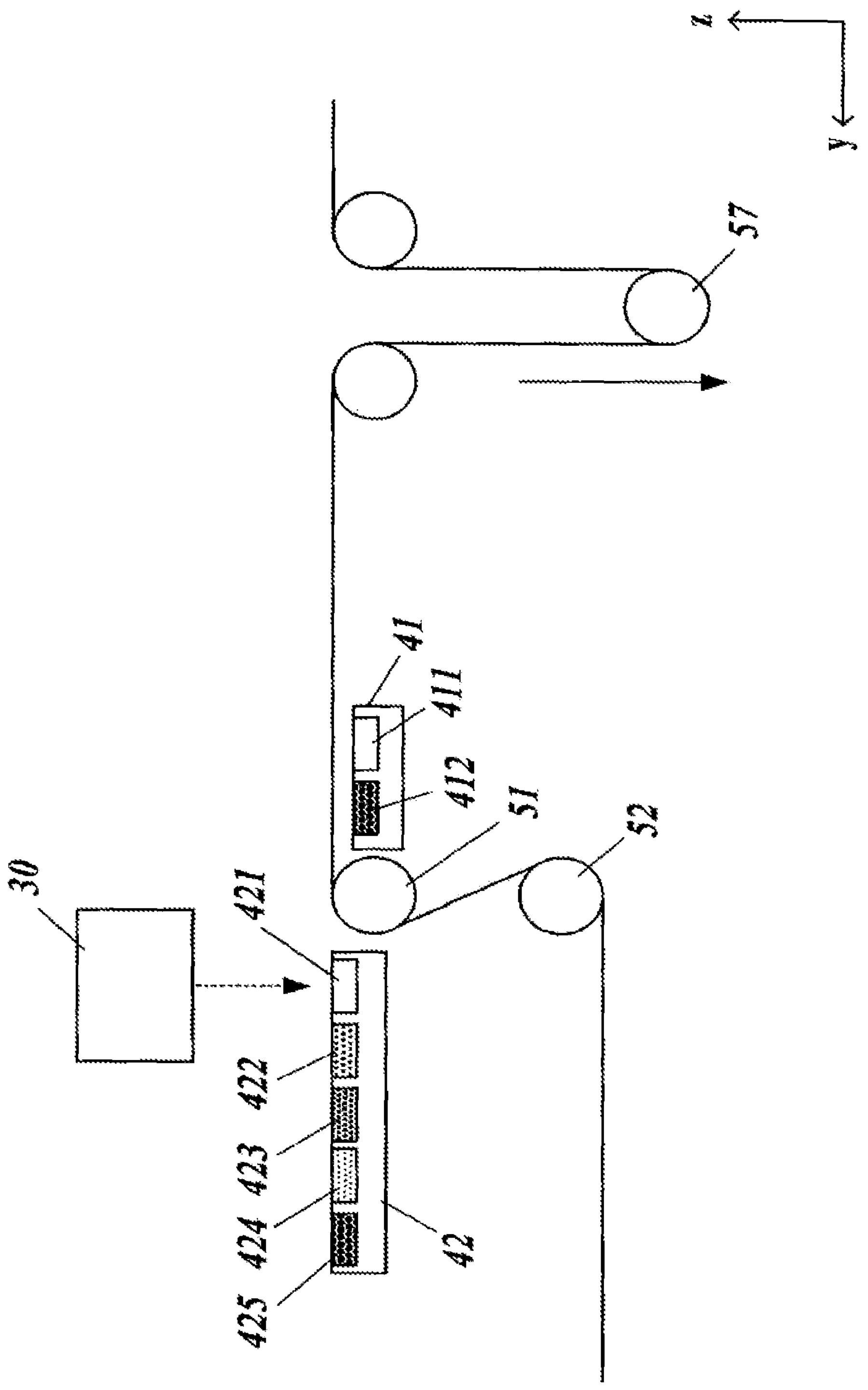
FIG. 8B is a front view showing the second arrangement in the case where the dancer roller is used.

FIG. 8A and FIG. 8B show a configuration example of a case where the image forming apparatus G has a dancer roller 57 on the upstream side of the image reading unit 30 in the paper conveying direction y.

At the time of switching from the first arrangement to the second arrangement, the background member 41, the color sample member 42 and the rollers 51 and 52 move toward the upstream side in the paper conveying direction y, and in conjunction with this movement, the dancer roller 57 moves toward the lower side in the height direction z, thereby absorbing the slack of the long paper caused by the movement of the rollers 51 and 52, as shown in FIG. 8B. This can stop conveying the long paper on the downstream side of the dancer roller 57 in the paper conveying direction y.

At the time of switching to the first arrangement in which the image reading unit 30 faces the background member 41, which is performed when reading of the color sample member 42 has finished, the background member 41, the color sample member 42 and the rollers 51 and 52 move toward the downstream side in the paper conveying direction y, and in conjunction with this movement, the dancer roller 57 moves toward the upper side in the height direction z, as shown in FIG. 8A. This can restart conveying the long paper, which has been stopped on the downstream side of the dancer roller 57 in the paper conveying direction y, toward further downstream.

Figure 9:
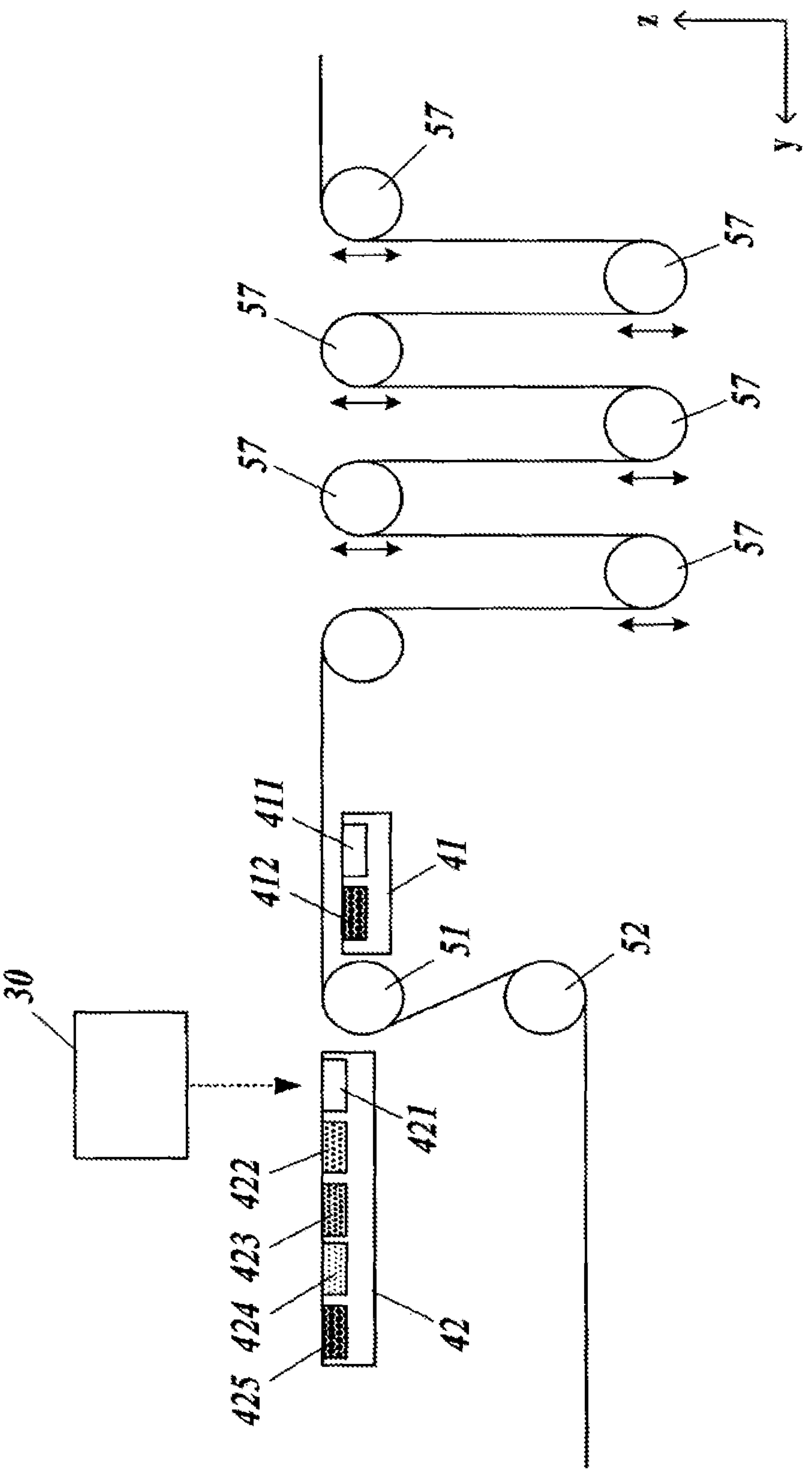
FIG. 9 is a front view showing a case where a plurality of dancer rollers is used.
Figure 10:
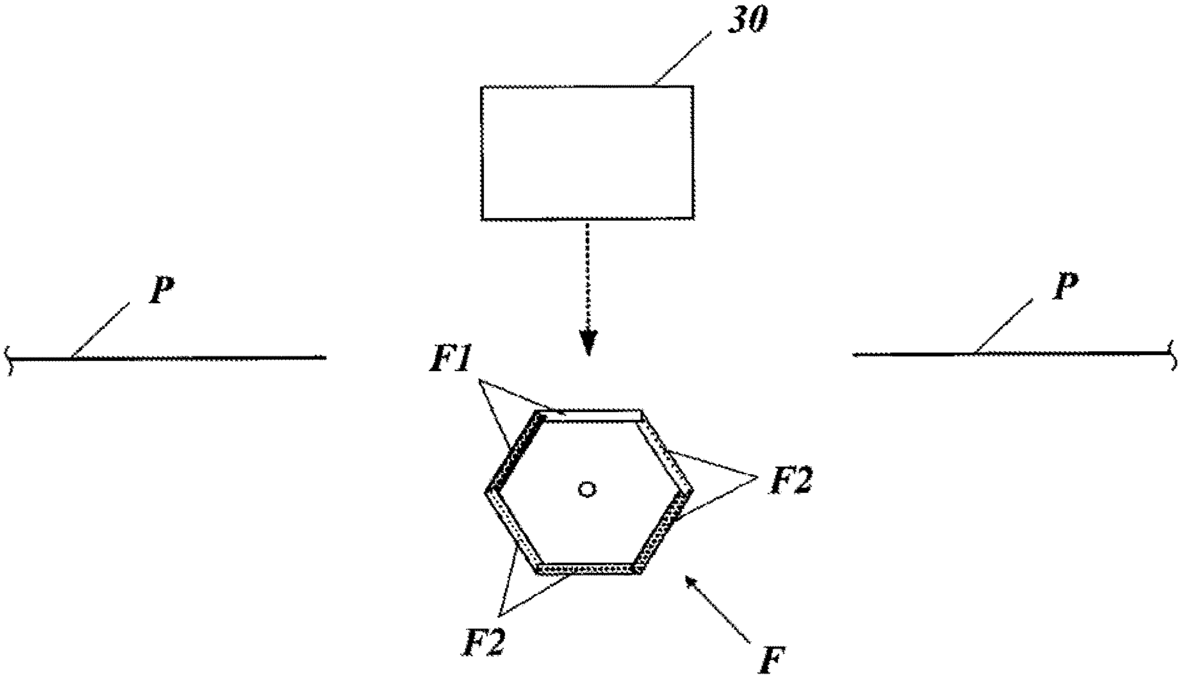
FIG. 10 is a front view showing an example of switching the background member and the color sample member in a case where cut paper is used.

If a plurality of dancer rollers 57 is used as shown in FIG. 9, the conveying stop time of the long paper at the position facing the image reading unit 30 can be extended.

At the time of stopping conveying the long paper, the dancer rollers 57 disposed on the upper side in the height direction z move further upward, whereas the dancer rollers 57 disposed on the lower side in the height direction z move further downward. The number of dancer rollers 57 to move among the dancer rollers 57 and/or the moving amount(s) thereof may be adjusted according to the target conveying stop time.

After the control unit 11 switches from the first arrangement to the second arrangement, the image reading unit 30 starts reading the color sample member 42 (Step S3). When the image reading unit 30 has finished reading the color sample member 42 (Step S4; YES), the control unit 11 performs control to move the background member 41, the color sample member 42 and the rollers 51 and 52, thereby switching to the first arrangement in which the image reading unit 30 faces the background member 41 via the long paper (Step S5).

For example, in the case where the second arrangement shown in FIG. 3B is taken, the switch to the first arrangement can be made by moving the background member 41, the color sample member 42 and the rollers 51 and 52 toward the downstream side in the paper conveying direction y until the background member 41 faces the image reading unit 30 as shown in FIG. 3A.

As described above, the image forming apparatus G of the embodiment includes: the conveying member 50; the image forming unit 20 which forms an image on long paper being conveyed by the conveying member 50; the image reading unit 30 which reads a surface of the long paper, the surface having the image formed by the image forming unit 20; and the background member 41 and the color sample member 42 which are arrangeable at the position facing the image reading unit 30, wherein the long paper is conveyed by the conveying member 50 to pass through between the image reading unit 30 and the background member 41 and avoid passing through between the image reading unit 30 and the color sample member 42, and a switch between the first arrangement in which the image reading unit 30 faces the background member 41 via the long paper and the second arrangement in which the image reading unit 30 faces the color sample member 42 is made by moving the background member 41, the color sample member 42 and the conveying member 50.

Hence, the switch between reading of the surface of the paper with the background member 41 as the background and reading of the color sample member 42 can be made even when the using paper is long paper. This eliminates necessity of the work to stop conveying the long paper and remove the long paper from the paper path for calibration, and therefore calibration can be performed during image forming, so that high image quality can be maintained.

The above embodiment is one of preferred examples of the present invention and hence is not intended to limit the present invention. Appropriate modifications can be made without departing from the scope or spirit of the present invention.

For example, in the above embodiment, the switch between the first arrangement in which the image reading unit 30 faces the background member 41 via the long paper and the second arrangement in which the image reading unit 30 faces the color sample member 42 is made by changing the positions of the background member 41 and the color sample member 41 with the position of the image reading unit 30 fixed. Because the image reading unit 30 is a high-resolution device and larger than the background member 41 and so forth, moving the background member 41 and the color sample member 42 is easier for the position adjustment. However, the switch between the first arrangement and the second arrangement can also be made by moving the image reading unit 30. In the case of moving the image reading unit 30 too, the moving amount thereof can be adjusted such that the image reading unit 30 faces a color region of the plurality of color regions of the background member 41 or the color sample member 42.

What is claimed is:

1. An image forming apparatus, comprising:
(a) an image forming unit configured to form an image on a recording medium;
(b) a conveying unit configured to convey the recording medium with the image formed by the image forming unit;
(c) a reading unit configured to read a color sample; and
(d) an area in which the color sample is positioned, wherein when the reading unit reads the color sample in the area, the area is between the reading unit and the recording medium with the image formed by the image forming unit.

2. The image forming apparatus according to claim 1, wherein the color sample is moved to the area.

3. The image forming apparatus according to claim 1, wherein the image forming unit is configured to form the image on a recording medium based on data described in Page Description Language.

4. The image forming apparatus according to claim 3, wherein the data described in Page Description Language is send from an external apparatus.

5. The image forming apparatus according to claim 1, wherein the color sample has a plurality of colors.

6. The image forming apparatus according to claim 5, wherein the plurality of colors are lined in the recording medium conveying direction.

7. The image forming apparatus according to claim 1, wherein the conveying unit has rollers.

8. An image forming apparatus, comprising:
(a) an image forming unit configured to form an image on a recording medium based on an image forming job;
(b) a conveying unit configured to convey the recording medium with the image formed by the image forming unit to a paper ejecting position; and
(c) a reading unit configured to read a color region for calibration, wherein the reading unit reads the color region in an area below the reading unit and away from where the conveying unit is configured to convey the recording medium during the image forming job.

9. The image forming apparatus according to claim 8, wherein the reading unit is above at least a part of the conveying unit.

10. The image forming apparatus according to claim 9, further comprising a recording medium path which the recording medium is conveyed along by the conveying unit, wherein the reading unit is above the recording medium path.

11. The image forming apparatus according to claim 8, wherein the color region is moved to a position where the color region is read by the reading unit.

12. The image forming apparatus according to claim 8, wherein the image forming job has a data described in Page Description Language.

13. The image forming apparatus according to claim 12, wherein the data described in Page Description Language is send from an external apparatus.

14. The image forming apparatus according to claim 8, wherein the color region has a plurality of colors.

15. The image forming apparatus according to claim 14, wherein the plurality of colors are lined in a recording medium conveying direction.

16. The image forming apparatus according to claim 8, wherein the conveying unit has rollers.

17. An image forming apparatus, comprising:
(a) an image forming unit configured to form an image on a recording medium;
(b) a conveying unit configured to convey the recording medium with the image formed by the image forming unit;

(c) a reading unit configured to read a color sample in an area in which a color sample is positioned, the area being between the reading unit and the recording medium with the image formed by the image forming unit; and (d) a controller configured to cause the reading unit to read the color sample in the area while image forming job is being performed.

18. The image forming apparatus, comprising:

(a) an image forming unit configured to form an image on a recording medium based on an image forming job;

(b) a conveying unit configured to convey the recording medium with the image formed by the image forming unit to a paper ejecting position;

(c) a reading unit configured to read a color region for calibration, and (d) a controller configured to cause the reading unit to read the color sample in an area below the reading unit and away from where the conveying unit is configured to convey the recording medium during the image forming job.

19. An image forming method, comprising:

(a) forming an image by an image forming unit on a recording medium;

(b) conveying the recording medium by a conveying unit configured to convey the recording medium with the image formed by the image forming unit;

(c) reading a color sample by a reading unit in an area where the color sample is positioned, the area being between the reading unit and the recording medium with the image formed by the image forming unit, and wherein the reading unit reads the color sample in the area while image forming job is being performed.

20. A non-transitory computer readable storage medium storing a program, the program being executable by a computer to prompt the computer to perform the method of claim 19.

21. An image forming method, comprising:

(a) forming an image by an image forming unit configured to form the image on a recording medium based on an image forming job;

(b) conveying the recording medium by a conveying unit configured to convey the recording medium with the image formed by the image forming unit to a paper ejecting position; and (c) reading a color region for calibration by a reading unit, wherein the reading the color region occurs in an area below the reading unit and away from where the conveying unit is configured to convey the recording medium during the image forming job.

22. A non-transitory computer readable storage medium storing a program, the program being executable by a computer to prompt the computer to perform the method of claim 21.

* * * * *